US009041740B2

(12) United States Patent
Sugiyama et al.

(10) Patent No.: US 9,041,740 B2
(45) Date of Patent: May 26, 2015

(54) VEHICULAR DISPLAY DEVICE AND VEHICULAR DISPLAY SYSTEM

(71) Applicant: YAZAKI CORPORATION, Tokyo (JP)

(72) Inventors: Tetsuya Sugiyama, Susono (JP); Kunimitsu Aoki, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/780,797

(22) Filed: Feb. 28, 2013

(65) Prior Publication Data

US 2013/0176335 A1    Jul. 11, 2013

Related U.S. Application Data

(63) Continuation of application No. PCT/JP2011/070002, filed on Sep. 2, 2011.

(30) Foreign Application Priority Data

Sep. 3, 2010 (JP) ................................. 2010-198296

(51) Int. Cl.
*G06T 19/00* (2011.01)
*B60K 35/00* (2006.01)
*G02B 27/01* (2006.01)

(52) U.S. Cl.
CPC ............. *G06T 19/006* (2013.01); *B60K 35/00* (2013.01); *B60K 2350/2052* (2013.01); *G02B 27/01* (2013.01); *G02B 2027/014* (2013.01); *G02B 2027/0141* (2013.01)

(58) Field of Classification Search
None
See application file for complete search history.

(56) References Cited

U.S. PATENT DOCUMENTS 5,784,036 A * 7/1998 Higuchi et al. .................... 345/7
6,859,147 B2 * 2/2005 Buscemi ....................... 340/902

(Continued)

FOREIGN PATENT DOCUMENTS

JP    3-276836 A    12/1991
JP    5-185883 A    7/1993

(Continued)

OTHER PUBLICATIONS

International Search Report for PCT/JP2011/070002, dated Oct. 11, 2011 [PCT/ISA/210].

(Continued)

*Primary Examiner* — Xiao M. Wu
*Assistant Examiner* — Steven Elbinger
(74) *Attorney, Agent, or Firm* — Sughrue Mion, PLLC

(57) ABSTRACT

A vehicular display device includes a display unit that displays visible information and a light projection unit that guides light including the visible information displayed on the display unit to a predetermined projection surface, and displaying the visible information as a virtual image. The vehicular display device includes a guide display unit and a guide display control unit. The guide display unit indicates a relationship between at least positions of a first display region in which the virtual image is displayed by projection of the light projection unit and a second display region in which detailed information is displayed. The detailed information has an association with a content of particular information that is displayed on the display unit under a predetermined condition. The guide display control unit controls the guide display unit into a display state when the particular information is displayed on the display unit.

8 Claims, 17 Drawing Sheets

(56) References Cited

U.S. PATENT DOCUMENTS

2010/0253493 A1* 10/2010 Szczerba et al. ............ 340/435
2010/0321170 A1* 12/2010 Cooper et al. ............ 340/425.5

FOREIGN PATENT DOCUMENTS

| | | |
|---|---|---|
| JP | 08-227498 A | 9/1996 |
| JP | 08-318759 A | 12/1996 |
| JP | 2000-219060 A | 8/2000 |
| JP | 2008-001120 A | 1/2008 |
| JP | 2008001120 A * | 1/2008 |

OTHER PUBLICATIONS

Written Opinion for PCT/JP2011/070002, dated Oct. 11, 2011 [PCT/ISA/237].

Communication issued Jun. 10, 2014, by the Japanese Patent Office for corresponding Japanese Application No. 2010-198296.

* cited by examiner

VEHICULAR DISPLAY DEVICE AND VEHICULAR DISPLAY SYSTEM

CROSS REFERENCE TO RELATED APPLICATION

This is a continuation of International Application No. PCT/JP2011/070002 filed on Sep. 2, 2011, and claims priority from Japanese Patent Application No. 2010-198296, filed on Sep. 3, 2010, the entire disclosures of which are incorporated herein by reference.

BACKGROUND

The invention is related to a vehicular display device and a vehicular display system having a display unit that displays visible information and a light projection unit that guides light including the visible information that is displayed on the display unit to a predetermined projection surface, and displaying the visible information as a virtual image.

In a vehicular display device, a head-up display (HUD) having good visibility may be used so as to enable a driver to immediately recognize information having a small amount of the information and a high degree of urgency.

The vehicular head-up display is to guide a light image, which includes visible information to be displayed on a display unit in a display device body, onto a windshield (front glass) of a vehicle and to project the same on a surface of the windshield. When a driver looks ahead in a normal driving posture, the driver can visually recognize not only front scenery and a part of the vehicle, which are seen through the windshield, but also the visible information projected by the head-up display. The visible information that is visually recognized by the driver is formed as a virtual image at the front of the surface of the windshield, for example at a several meter position distant from a viewpoint. Therefore, the driver can recognize the front scenery and the display content of the head-up display by focusing the eyes during the driving.

The head-up display device is generally configured so that a device body thereof is arranged in an instrument panel of the vehicle. The light of the visible information that is displayed on the display unit in the device body is projected towards a projection area such as a windshield, a combiner and the like via a light path including a reflection member such as an enlarging system mirror, so that a virtual image is formed at a predetermined position distant from the viewpoint of the driver.

The related art of the vehicular head-up display device is disclosed in PTL 1, for example. In PTL 1, when an abnormality is detected, a master warning is displayed at a state where the abnormality at one part and the simultaneous abnormalities at a plurality of parts can be distinguished. That is, a content that is displayed by the head-up display and the like has a small amount of information. Therefore, when at least one abnormality occurs, the corresponding abnormality is generally displayed as a master warning in the head-up display and the like. Regarding this, according to PTL 1, when it is detected that one abnormality has occurred, the mater warning is lighted, and when it is detected that a plurality of abnormalities has occurred at the same time, the master warning is blinked, so that they are distinguished.

The same related art is also disclosed in PTL 2. According to PTL 2, a display state on a unified display unit equivalent to the master warning is switched depending on whether the number of an individual display unit turned to the display state is singular or plural.

In a vehicle having the head-up display, it is assumed that when any abnormality of the vehicle is detected, a display of the head-up display is used to issue a warning by displaying a simple symbol such as T, for example. Thereby, the driver can immediately recognize that the abnormality has occurred.

Also, a general vehicle has an instrument unit, which includes a speed meter, a tachometer, a water temperature gauge, a fuel gauge and a plurality of warning lights mounted at places of an instrument panel. Additionally, many vehicles mount thereon a monitor display unit that can display a variety of character strings, figures, images and the like, as required.

Accordingly, when a warning is displayed on the head-up display, the driver can comprehend a specific content relating to the warning by referring to the display of the instrument unit on the instrument panel or the display content of the monitor display unit.

However, all the drivers cannot immediately comprehend a current situation. For example, when the driver is a beginner driver, an old driver or a driver who has not read the manual or just after the driver purchases a new vehicle, it is thought in many cases that the driver does not almost understand functions or operations of the various display devices provided to the vehicle. That is, when an abnormality is detected in the vehicle, so that a warning such as '!' is displayed on the head-up display, if the driver does not care about what the warning means, the driver does not refer to an operation for comprehending a current situation, i.e., the display of an instrument plate and the display content of the monitor display unit.

Also, a variety of instruments and warning lights are present at various places on the instrument unit. Also, in many cases, there are separate display units such as monitor display unit even at a place other than the instrument unit. Therefore, even when the driver recognizes that any abnormality has occurred as regards the warning such as '!' on the head-up display, the driver cannot immediately determine whether the driver should refer to the display of which place unless the driver is familiar with the driving of the vehicle.

Due to the above reasons, even though the vehicle has the head-up display having good visibility, when an abnormality having a high degree of urgency, the driver cannot immediately comprehend a content of the abnormality, so that a serious vehicle malfunction or traffic accident may be caused.

[PTL 1] JP-A-5-185883
[PTL 2] JP-A-3-276836

SUMMARY

It is therefore one advantageous aspect of the present invention to provide a vehicular display device and a vehicular display system capable of carrying out guidance, in a vehicle having a head-up display mounted thereon, which aids a driver who does not understand how the display system operates to comprehend a situation when a special display such as vehicular warning appears.

According to one advantage of the invention, there is provided a vehicular display device, including a display unit that displays visible information and a light projection unit that guides light including the visible information displayed on the display unit to a predetermined projection surface, and displaying the visible information as a virtual image, the vehicular display device includes:

a guide display unit that indicates a relationship between at least positions of a first display region in which the virtual image is displayed by projection of the light projection unit and a second display region in which detailed information is displayed, the detailed information having an association with a content of particular information that is displayed on the display unit under a predetermined condition; and a guide display control unit that controls the guide display unit into a display state when the particular information is displayed on the display unit.

The guide display unit may include at least one light emitting element for guidance that can be lighted up and turned off by the guide display control unit.

The vehicular display device may be configured such that: the guide display unit includes a plurality of light emitting elements for guidance that can be lighted up and turned off by the guide display control unit, and the guide display control unit individually lights up and turns off the plurality of light emitting elements for guidance and displays a flowing state of a direction from the first display region towards the second display region.

According to another advantage of the invention, there is provided a vehicular display system includes:

a first vehicular display device, including a display unit that displays first visible information and a light projection unit that guides light including the first visible information displayed on the display unit to a predetermined projection surface, and displaying the first visible information as a virtual image;

a second vehicular display device displaying more information than the first vehicular display device, as second visible information;

a guide display unit, provided to at least one of a place on the first vehicular display device, a place on the second vehicular display device and a space between the places, and indicating a relationship between at least positions of a first display region in which the virtual image is displayed by projection of the light projection unit of the first vehicular display device and a second display region on the second vehicular display device in which detailed information is displayed, the detailed information having an association with a content of particular information that is displayed in the first display region under a predetermined condition; and a guide display control unit that controls the guide display unit to a display state when the particular information is displayed on the display unit of the first vehicular display device.

The vehicular display system may be configured such that: the guide display unit includes a first guide display unit including at least one light emitting element for guidance that is arranged on the first vehicular display device and a second guide display unit including at least one light emitting element for guidance that is arranged on the second vehicular display device, and the guide display control unit, individually lights up and turns off the light emitting element for guidance of the first guide display unit and the light emitting element for guidance of the second guide display unit, and displays a flowing state of a direction from the first display region towards the second display region.

According to another advantage of the invention, there is provided a vehicular display device displaying detailed information on a vehicle as first visible information, the vehicular display device includes:

a guide display unit that is arranged between a first display region in which the first visible information is displayed and a second display region in which information is displayed as second visible information of a virtual image, and that indicates a relationship between at least positions of the first display region and the second display region, the information displayed in the second display region having an association with the detailed information and more restricted than the detailed information; and a guide display control unit that controls the guide display unit into a display state when predetermined particular information is displayed in the second display region.

The vehicular display device may be configured such that: the guide display unit includes a plurality of light emitting elements for guidance that can be lighted up and turned off by the guide display control unit, and the guide display control unit, individually lights up and turns off the plurality of light emitting elements for guidance, and displays a flowing state of a direction from the first display region towards the second display region.

The vehicular display device may be configured such that: the vehicular display device further includes a light reflection plate that is arranged at a position displaced from a windshield of the vehicle towards a vehicle interior, and the detailed information is projected onto the light reflection plate so as to be displayed as a first virtual image, and at the same time, a display state of the guide display unit is projected onto the light reflection plate so as to be displayed as a second virtual image at a position displaced from the first virtual image.

DETAILED DESCRIPTION OF EXEMPLIFIED EMBODIMENTS

Specific illustrative embodiments relating to the vehicular display device and the vehicular display system of the invention will be described with reference to the accompanying drawings.

Figure 1:
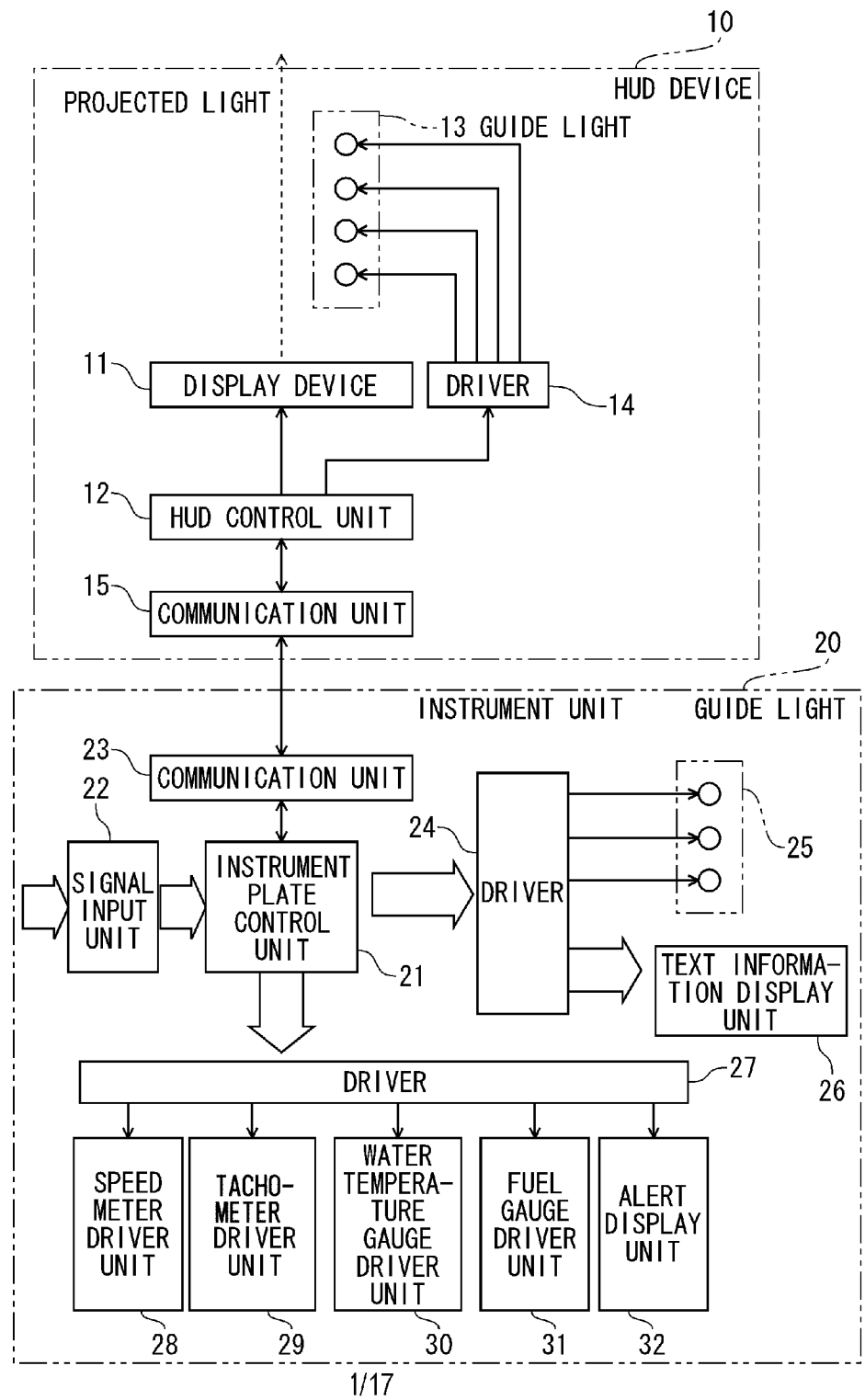
FIG. 1 is a block diagram showing an embodiment of an electric system of a vehicular display system.

An embodiment of an electric system of a vehicular display system is shown in FIG. 1. As shown in FIG. 1, the vehicular display system includes an HUD (head-up display) device 10 that is the vehicular display device and an instrument unit 20.

As described below, the HUD device 10 projects a light image towards a windshield (front glass) of a vehicle having the HUD device mounted thereon and thus display information such as vehicle speed so that the light image is seen from a viewpoint of a driver as a virtual image to be formed at a front position of the windshield. The instrument unit 20 is a device in which a variety of instruments such as speed meter and tachometer and an alert display unit are integrated and is arranged on an instrument panel of the vehicle so that the driver can easily see the same.

As shown in FIG. 1, the HUD device 10 has a display device 11, an HUD control unit 12, a guide light 13, a driver 14 and a communication unit 15. The HUD control unit 12 consists of a microcomputer and controls a whole operation of the HUD control unit 12.

The display device 11 is a device that can display a digit character, a symbol and the like as visible information. For example, the display device 11 may be configured by combining a transmissive liquid crystal display unit and a backlight for illumination. The other display units may be also used.

The guide light 13 has four light emitting diodes that are arranged in a line. A display of the guide light 14 is used to carry out special guidance, as described below. The driver 14 is provided to individually control power feeding to the respective light emitting diodes of the guide light 13. The communication unit 15 is provided to perform data communication between the HUD device 10 and the instrument unit 20.

The display device 11 projects a light containing the displayed visible information towards a predetermined direction, as a projected light shown in FIG. 1. The guide light 13 is arranged in the vicinity of a light path of the projected light. The projected light is projected onto the windshield via a predetermined optical system.

As shown in FIG. 1, the instrument unit 20 has an instrument plate control unit 21, a signal input unit 22, a communication unit 23, a driver 24, a guide light 25, a text information display unit 26, a driver 27, a speed meter driver unit 28, a tachometer driver unit 29, a water temperature gauge driver unit 30, a fuel gauge driver unit 31 and an alert display unit 32.

The instrument plate control unit 21 consists of a microcomputer. The microcomputer executes a program that has been already installed, thereby controlling a whole operation of the instrument unit 20.

The signal input unit 22 inputs a variety of signals indicating states of respective units of the vehicle, which are display targets. For example, a vehicle speed pulse signal that can be used to calculate a vehicle speed, a signal indicating an engine revolution, a signal indicating a temperature of cooling water, a signal indicating a remaining amount of fuel and the like are input to the instrument plate control unit 21 through the signal input unit 22.

The communication unit 23 has a function for performing data communication between the instrument plate control unit 21 of the instrument unit 20 and the HUD device 10.

The guide light 25 and the text information display unit 26 are connected to the instrument plate control unit 21 through the driver 24. The guide light 25 has three light emitting diodes that are arranged in a line. A display of the guide light 25 is used to carry out special guidance, as described below.

The text information display unit 26 is a display unit that can display detailed text information relating to a variety of alerts and the like. The text information display unit 26 may be configured by a liquid crystal display unit, for example. An amount of the information that can be displayed by the text information display unit 26 is set so that it is sufficiently larger than that of the display device 11 of the HUD device 10.

The speed meter driver unit 28, the tachometer driver unit 29, the water temperature gauge driver unit 30, the fuel gauge driver unit 31 and the alert display unit 32 are connected to the instrument plate control unit 21 through the driver 27.

The speed meter driver unit 28 drives a pointer of a speed meter (not shown) so that it indicates a value corresponding to the latest vehicle speed obtained by measurement. The tachometer driver unit 29 drives a pointer of a tachometer (not shown) so that it indicates a value corresponding to the latest engine revolution obtained by measurement. Likewise, the water temperature gauge driver unit 30 drives a pointer of a water temperature gauge (not shown) and the fuel gauge driver unit 31 drives a pointer of a fuel gauge (not shown). The alert display unit 32 has a plurality of warning lights corresponding to respective abnormalities so as to individually warn the abnormalities occurring.

Figure 2:
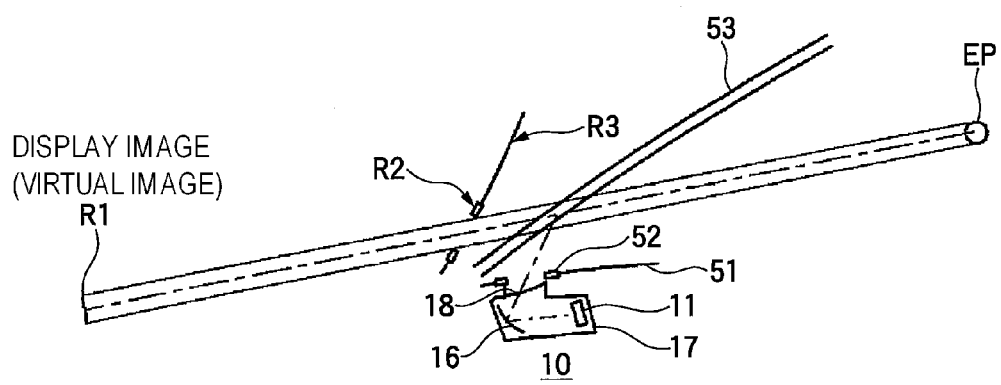
FIG. 2 is a longitudinal sectional view showing a basic structure and a light path of an HUD device of FIG. 1, which is seen from a side of a vehicle.
Figure 3:
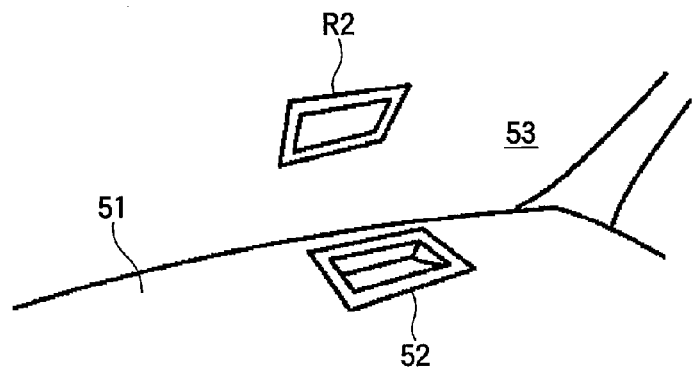
FIG. 3 is a perspective view showing a state where a windshield is seen from a vehicle interior of a vehicle having the HUD device of FIG. 1 mounted thereon.
Figure 4:
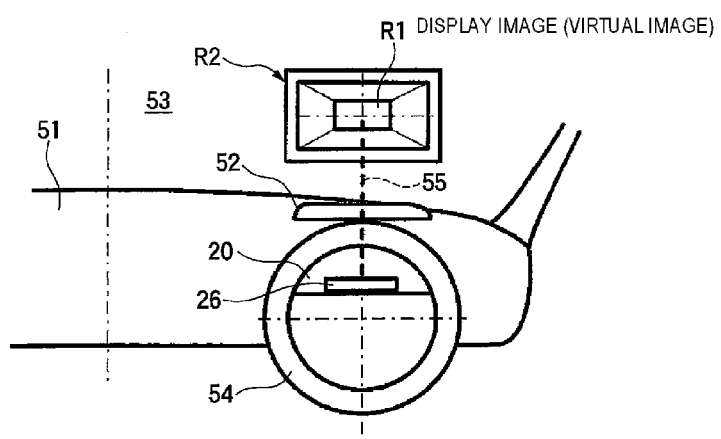
FIG. 4 is a front view showing a state where the windshield is seen from the vehicle interior of the vehicle having the HUD device of FIG. 1 mounted thereon.
Figure 5:
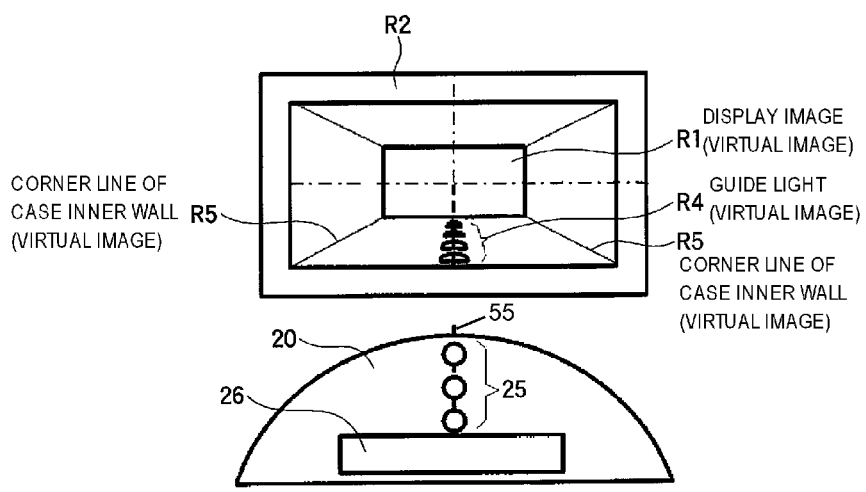
FIG. 5 is an enlarged front view showing a part of FIG. 4.

Subsequently, a physical structure and an operation of the vehicular display system are described. A basic structure and a light path of the HUD device 10 shown in FIG. 1 are shown in FIG. 2. FIG. 2 is a longitudinal sectional view, which is seen from a side of the vehicle. Also, FIGS. 3 and 4 show a state where the windshield is seen from a vehicle interior of the vehicle having the HUD device 10 of FIG. 1 mounted thereon. FIG. 3 shows a state where the front, i.e., the front of a driver seat is obliquely seen from a passenger seat and FIG. 4 shows a state where the front is seen from a vicinity of a normal viewpoint position of the driver. Also, FIG. 5 shows an enlarged view of main parts of FIG. 4.

Figure 6:
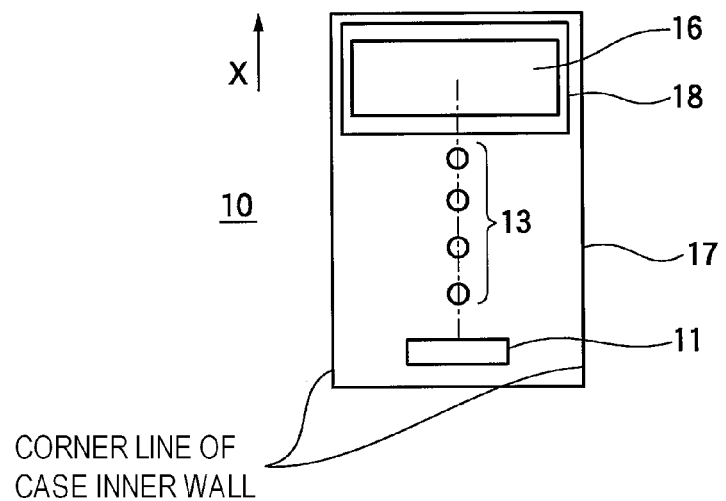
FIG. 6 is a plan view showing an outer shape of the HUD device of FIG. 1 and an internal structure thereof projected from the upper.
Figure 7:
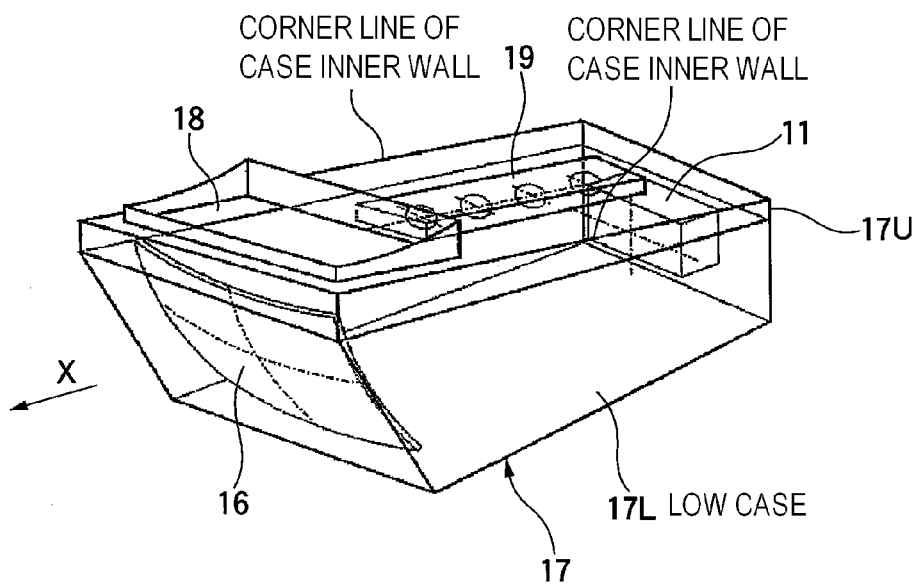
FIG. 7 is a perspective view showing the outer shape of the HUD device of FIG. 1 and a projected internal structure thereof.

Also, an outer shape and an internal structure of the HUD device 1 of FIG. 1 are shown in FIGS. 6 and 7. FIG. 6 shows an internal structure projected from the upper of the HUD device 10 and FIG. 7 shows the internal structure of the HUD device 10 projected from an oblique direction.

As shown in FIG. 2, a main body of the HUD device 10 is accommodated at an inside of the instrument panel 51 of the vehicle. The predetermined visible information, for example vehicle speed display information such as '60 km/h' and warning display information such as '!' are displayed by the display device 11 that is provided in an HUD case 17.

The visible information is emitted from the display device 11 as a projected light facing the front of the display device 11 by a self-light emission of the display device 11 or illumination light of a predetermined backlight. The projected light is reflected on an enlarging mirror 16 to thus face upwards, transmits a transparent cover 18 at an opening bezel 52 provided to an opening on the instrument panel 51 and is then projected on a surface of the windshield (front glass) 53.

In this illustrative embodiment, the structure of the HUD device 10 is restricted and simplified to the requisite constitutional elements so as to easily understand the structure. In reality, a plurality of mirrors may be arranged on the light path of the projected light, so that the structure is further complicated.

A variety of images are projected on the windshield 53. That is, a display image R1 that can be obtained as the light including the visible information displayed on the display device 11 of the HUD device 10 is projected, an opening bezel R2 imaged on the windshield, an instrument panel R3 imaged on the windshield and the like are visually recognized by the driver at a position of the viewpoint EP.

The display image R1, the opening bezel R2 and the instrument panel R3 are displayed as virtual images by reflection of the light, which do not exist really at corresponding positions. A position at which the display image R1 is formed is determined by a focusing length of an optical system in the HUD device 10 or a layout of the respective units. For example, it is realistic to set the corresponding position at a 2 m position distant from the viewpoint EP.

As shown in FIG. 3, the opening bezel 52 is arranged to cover a periphery of an upper opening of the instrument panel 51. An external light such as sunlight is entered and reflected on the opening bezel 52. By the reflected light, the opening bezel R2 (virtual image) imaged on the windshield is formed.

The projected light from the HUD device 10 passes through an inner area of the opening bezel 52 in the opening of the instrument panel 51 and is then entered on the surface of the windshield 53. Therefore, the display image R1 (virtual image) that is seen from the viewpoint EP appears in the inner area of the opening bezel R2 (virtual image), as shown in FIG. 4.

As shown in FIG. 4, the various display elements of the instrument unit 20, i.e., the instruments such as speed meter and tachometer and the text information display unit 26 are arranged on the front surface of the instrument panel 51 at the front of the opening bezel 52. Also, a steering wheel 54 is arranged between the instrument unit 20 and the driver. However, the driver can see a display content of the instrument unit 20 through an inner space (opening) of the steering wheel 54.

Here, a case is assumed in which an abnormality occurs in the vehicle, a warning thereof is displayed in the vicinity of a center of the display image R1 (virtual image) by the HUD device 10 and a detailed explanation about the abnormality having occurred is also displayed on the text information display unit 26 at the same time. In this case, since the warning of the display image R1 (virtual image) is immediately virtually recognized by the driver, the driver can notice that [[any]] some abnormality has occurred. However, the driver cannot know a content of the specific abnormality unless the driver sees the display of the text information display unit 26. However, except for a driver who knows well the operations of the display system, the driver may not notice that the detailed information about the warning of the display image R1 (virtual image) is being displayed and may not know a position of the text information display unit 26 on which the detailed information is displayed.

Here, for example, like a virtual guide line 55 shown in FIG. 4, the guidance is automatically carried out as if the driver's notice faces towards the text information display unit 26 along a line connecting a position at which the warning of the display image R1 (virtual image) is displayed and a position of the text information display unit 26 at which the detailed information is displayed.

Specifically, as shown in FIG. 5, a display R4 (virtual image) of the guide light is displayed in the vicinity of the display image R1 (virtual image) and the guide light 25 arranged in the vicinity of the text information display unit 26 of the instrument unit 20 is also displayed (lighted). The display R4 (virtual image) of the guide light and the guide light 25 are arranged between the position of the display image R1 (virtual image) and the position of the text information display unit 26 along the virtual guide line 55.

As shown in FIG. 5, the guide light 25 on the instrument unit 20 is configured by three light emitting diodes arranged in a line along the virtual guide line 55 and is arranged on the instrument unit 20 so that a lighting state thereof can be well seen from the viewpoint of the driver.

The display R4 (virtual image) of the guide light that is displayed in the vicinity of the display image R1 (virtual image) is a virtual image that is formed as the light emitting state of the guide light 13 provided to the HUD device 10 is projected on the windshield 53 together with the projected light of the HUD device 10.

As shown in FIG. 6, the four light emitting diodes of the guide light 13 are arranged in a line along an arrow X direction at a central portion of the HUD case 17. Also, the arrow X direction coincides with the front-rear direction of the vehicle. As shown in FIG. 7, the HUD case 17 is configured by combining an upper case 17U and a lower case 17L and a guide light unit 19 including the four light emitting diode of the guide light 13 is mounted to the upper case 17U. Also, the four light emitting diodes are respectively arranged on an inner wall surface of the upper case 17U so that they are exposed.

Therefore, when the guide light 13 is lighted up, a virtual image by the light emission is projected on the windshield 53, as the display R4 (virtual image) of the guide light shown in FIG. 5. Also, since the inside of the HUD case 17 is illuminated by the projected light and the like, a reflected light from the inner wall surface of the HUD case 17 is also projected on the windshield 53, so that a corner line R5 of a projected case inner wall (virtual image) and the like shown in FIG. 5 appear.

Figure 8A:
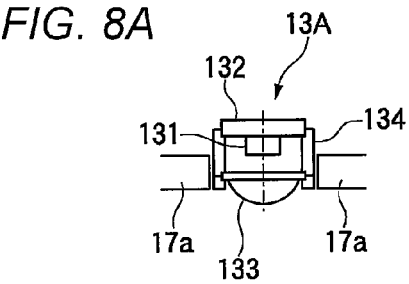
FIGS. 8A to 8C are longitudinal sectional views showing respective structures of guide lights of three types.
Figure 8C:
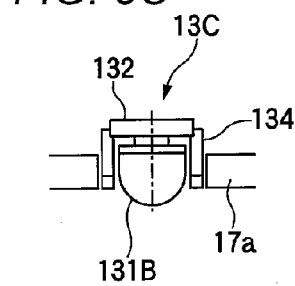
Figure 8B:
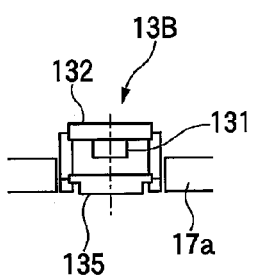

A variety of configurations may be considered as regards the guide light 13. FIGS. 8A, 8B and 8C show configurations of guide lights 13A, 13B, 13C of three types, respectively. Also, respective shapes of guide lights 13D, 13E, 13F, 13G of four types are shown in FIGS. 9A, 9B, 9C and 9D.

Regarding the guide light 13A shown in FIG. 8A, a light emitting diode 131 is mounted on a circuit substrate 132, a lens 133 is arranged at the front of a light emission surface of the light emitting diode 131 and the light emitting diode and the lens are surrounded and integrated by a case 134. The guide light 13A is arranged in an opening of an inner wall surface 17a of the HUD case 17.

Regarding the guide light 13B shown in FIG. 8B, a diffusion plate 135 is provided instead of the lens 133 of the guide light 13A. Regarding the guide light 13C shown in FIG. 8C, a light emitting diode 131B of a mold type (a cannonball type) in which the lens 133 or diffusion plate 135 is not necessary is adopted.

Figure 9A:
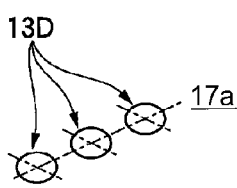
FIGS. 9A to 9D are perspective views showing respective shapes and surface positions of guide lights of four types.
Figure 9C:
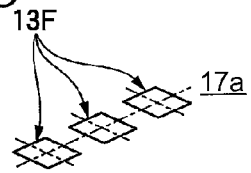
Figure 9B:
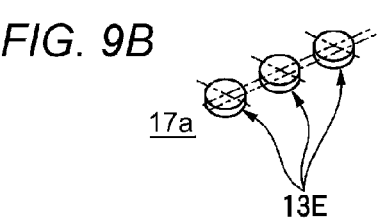
Figure 9D:
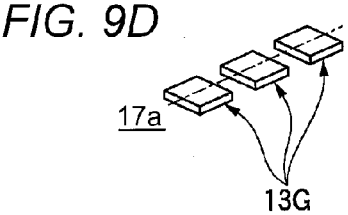

Also, the guide lights 13D, 13F shown in FIGS. 9A and 9C are arranged so that light emission surfaces (surfaces) thereof are flush with the inner wall surface 17a of the HUD case 17. The guide lights 13E, 13G have a stereoscopic shape in which tips including the light emission surfaces thereof slightly protrude from the inner wall surface 17a of the HUD case 17. Also, the light emission parts of the guide lights 13D, 13E have a circular surface shape and the light emission parts of the guide lights 13F, 13G have a rectangular (square) surface shape.

The guide light 25 on the instrument unit 20 may also have the same configuration as the guide lights 13A, 13B, 13C, 13D, 13E, 13F, 13G.

Also, regarding the guide lights 13D, 13E, 13F, 13G shown in FIGS. 9A to 9D, the plurality of light emitting diodes is arranged in a line at an interval. However, the light emitting diodes may be also continuously arranged. An embodiment where the plurality of light emitting diodes is continuously arranged is shown in FIGS. 11A to 11D, 12A and 12B.

Figure 11A:
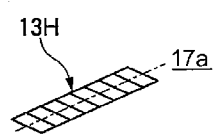
FIGS. 11A to 11D are perspective views showing respective shapes and surface positions of guide lights of four types that can be used in the modified embodiment shown in FIG. 10.
Figure 11C:
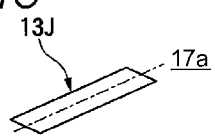
Figure 11B:
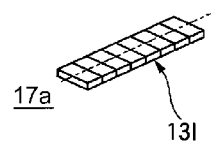
Figure 12A:
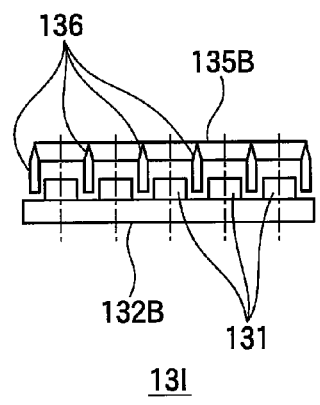
FIGS. 12A and 12B are front views showing respective structures of guide lights of two types that can be used in the modified embodiment shown in FIG. 10.

Regarding a guide light 13I shown in FIG. 11B, the five light emitting diodes 131 are substantially continuously arranged in a line on a circuit substrate 132B, as shown in FIG. 12A. Also, partition walls 136 for light shield are provided between the adjacent light emitting diodes 131 and a diffusion plate 135B is provided at the front of the light emission surfaces of the respective light emitting diodes 131. Therefore, as shown in FIG. 11B, the guide light 13I is configured so that a plurality of light emitting parts corresponding to positions of the respective light emitting diodes 131 is continuously arranged. Since the adjacent light emitting parts are respectively partitioned by the partition walls 136, the light does not leak into an adjacent area and each light emitting part can make an independent display. Also, since the diffusion plate 135B is provided, it is possible to remove illuminance unevenness of the respective light emitting parts. As shown in FIG. 11B, the guide light 13I has a stereoscopic shape in which a tips including the light emission surface slightly protrudes from the inner wall surface 17a of the HUD case 17. However, like a guide light 13H shown in FIG. 11A, the guide light may be also arranged so that the light emission surface (surface) is flush with the inner wall surface 17a of the HUD case 17.

Figure 11D:
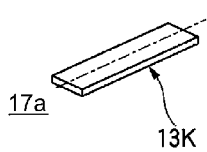
Figure 12B:
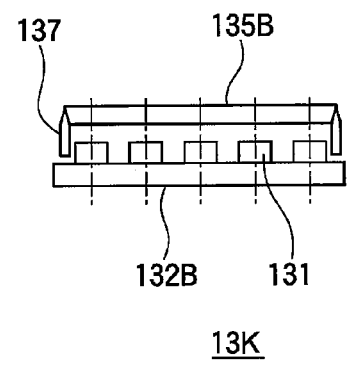

Regarding a guide light 13K shown in FIG. 11D, the five light emitting diodes 131 are substantially continuously arranged in a line on the circuit substrate 132B, as shown in FIG. 12B. Also, the diffusion plate 135B is provided at the front of the light emission surfaces of the respective light emitting diodes 131. Light shielding walls 137 are provided at the most front and at the most rear of the guide light 13K. Therefore, as shown in FIG. 11D, the guide light 13K is configured so that a plurality of light emitting parts corresponding to positions of the respective light emitting diodes 131 is continuously arranged. However, there is no partition wall 136 that is provided to the guide light 13I and the adjacent light emitting parts are influenced by the lights emitting therefrom. Therefore, a slight change (gradation) of the illuminance appears in the vicinity of a boundary of the adjacent light emitting parts. As shown in FIG. 11D, the guide light 13K has a stereoscopic shape in which a tips including the light emission surface slightly protrudes from the inner wall surface 17a of the HUD case 17. However, like a guide light 13J shown in FIG. 11C, the guide light may be also arranged so that the light emission surface (surface) is flush with the inner wall surface 17a of the HUD case 17.

The guide light 25 on the instrument unit 20 may also have the same configuration as the guide lights 13H, 13I, 13J, 13K.

Figure 10:
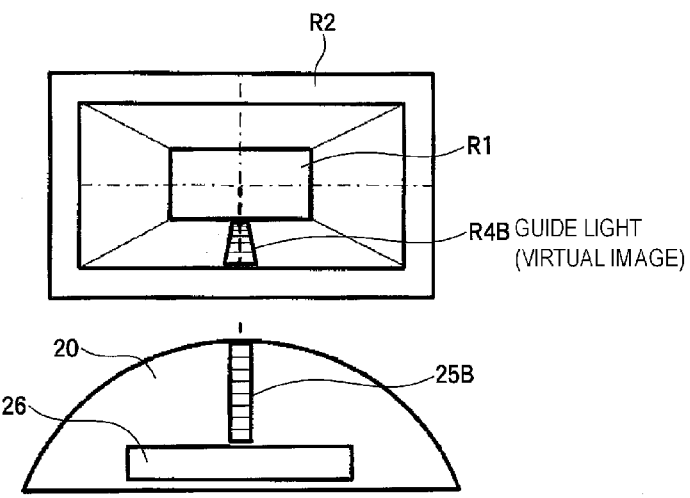
FIG. 10 is a front view showing a modified embodiment relating to the same place as that shown in FIG. 5.

An external appearance of a vehicular display system adopting the guide light 13 having any configuration of the guide lights 13H, 13I, 13J, 13K shown in FIGS. 11A to 11D and a guide light 25B is shown in FIG. 10 at a place equivalent to that of FIG. 5. As shown in FIG. 10, even when the structures of the guide lights 13H, 13I, 13J, 13K are adopted, it is possible to guide the driver from the position of the display image R1 (virtual image) towards the position of the text information display unit 26 by the display R4B of the projected guide light and the display of the guide light 25B, like the configuration of FIG. 5.

Figure 13:
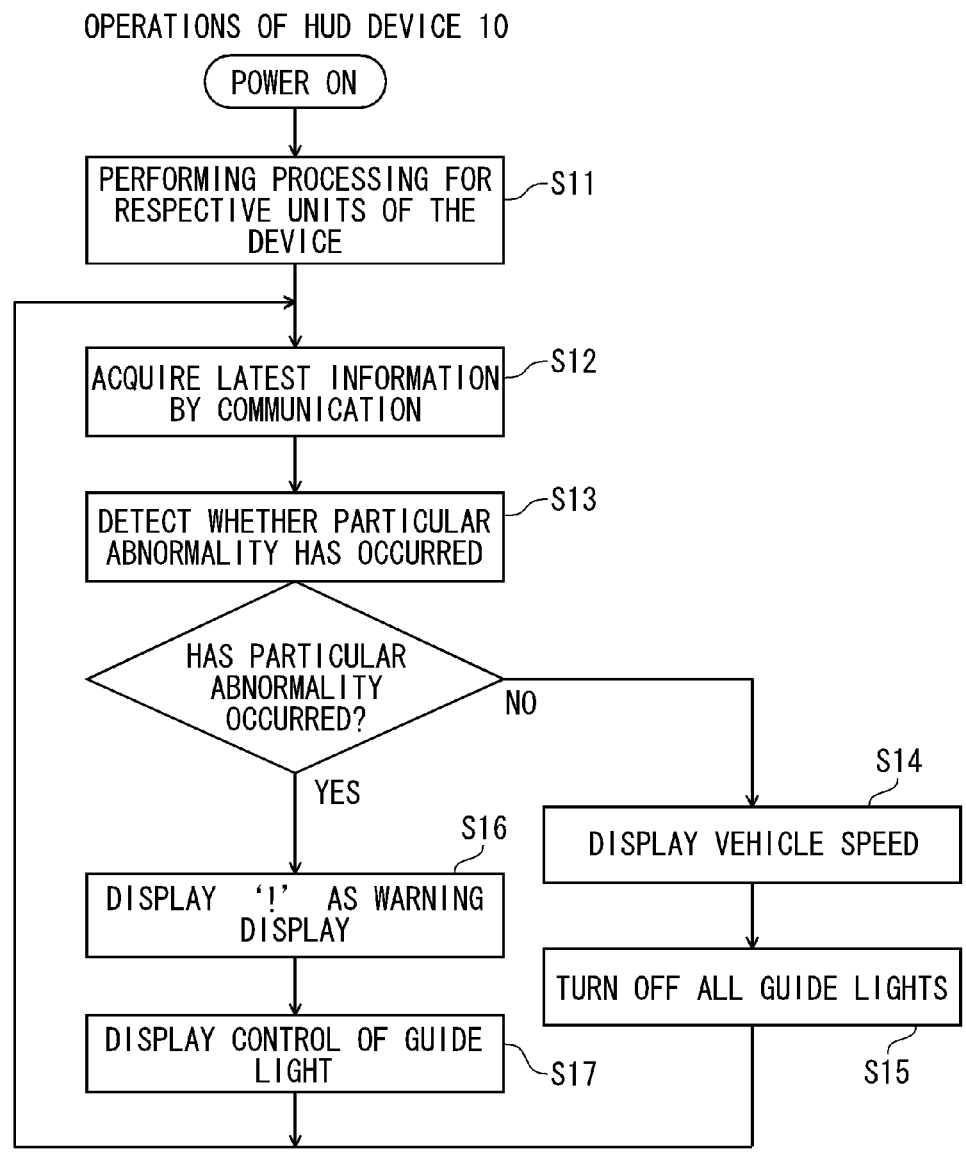
FIG. 13 is a flowchart showing an outline of an operation of the HUD device of FIG. 1.
Figure 14:
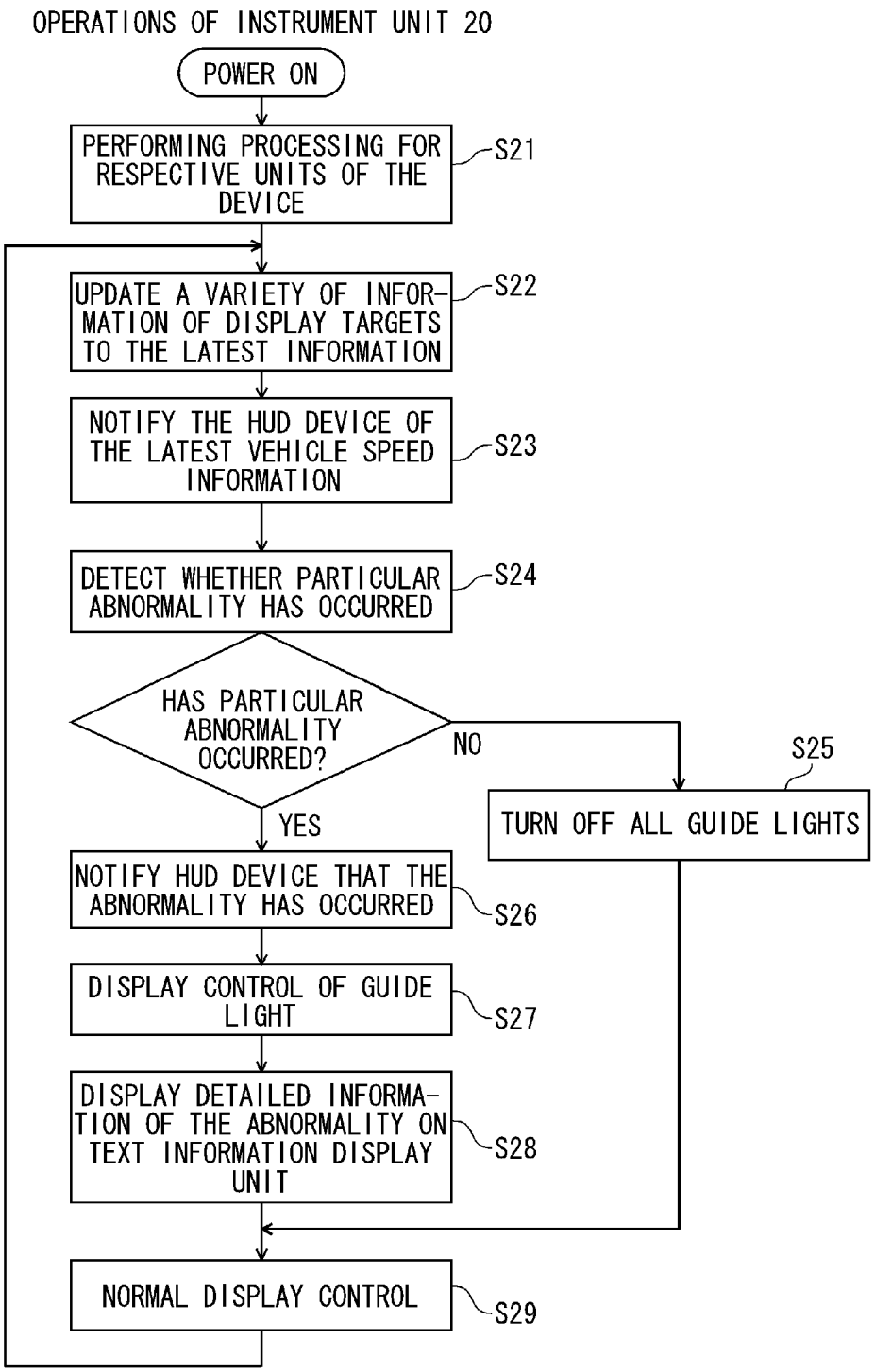
FIG. 14 is a flowchart showing an outline of operations of an instrument unit of FIG. 1.

The outlines of the operations of the HUD device 10 and the instrument unit 20 shown in FIG. 1 are shown in FIGS. 13 and 14. The operations shown in FIG. 13 are performed under control of the HUD control unit 12 and the operations shown in FIG. 14 are performed under control of the instrument plate control unit 21.

First, the operations of the HUD device 10 shown in FIG. 13 are described. When a power supply of the HUD device 10 becomes on, the HUD control unit 12 performs processing for the respective units in step S11. That is, the HUD control unit 12 initializes the internal therein and turns off all the light emitting diodes of the guide light 13 to thus erase the display of the display device 11.

In step S12, the HUD control unit 12 performs data communication with the instrument unit 20 via the communication unit 15 and thus acquires the latest information that should be displayed by the HUD device 10. For example, the HUD control unit acquires the information of the current vehicle speed, the information indicating whether a particular abnormality has occurred and the like.

In step S13, the HUD control unit 12 determines whether a 'particular abnormality' has occurred, based on the latest information acquired in step S12. The 'particular abnormality' means an abnormality that is predetermined so that the detailed information about the abnormality having occurred is displayed on the text information display unit 26, in this example. When the abnormality has not occurred, the HUD control unit 12 proceeds to step S14 and when it is detected that the abnormality has occurred, the HUD control unit 12 proceeds to step S16.

In step S14, the HUD control unit 12 outputs and displays the latest information, which is acquired in step S12, on the display device 11. The content that is displayed by the display device 11 is projected on the surface of the windshield 53 as the projected light and is thus displayed as the display image R1 (virtual image) shown in FIG. 5.

In step S15, the HUD control unit 12 turns off all the light emitting diodes of the guide light 13.

In step S16, since the HUD control unit 12 knows that the particular abnormality has occurred, based on the information acquired in step S12, the HUD control unit outputs and displays the text information of '!' on the display device 11, as a warning display for notifying the driver that the particular abnormality has occurred. The content that is displayed by the display device 11 is projected on the surface of the windshield 53 as the projected light and is thus displayed as the display image R1 (virtual image) shown in FIG. 5.

In step S17, the HUD control unit 12 controls the display of the guide light 13 to thus guide the driver.

Figure 15:
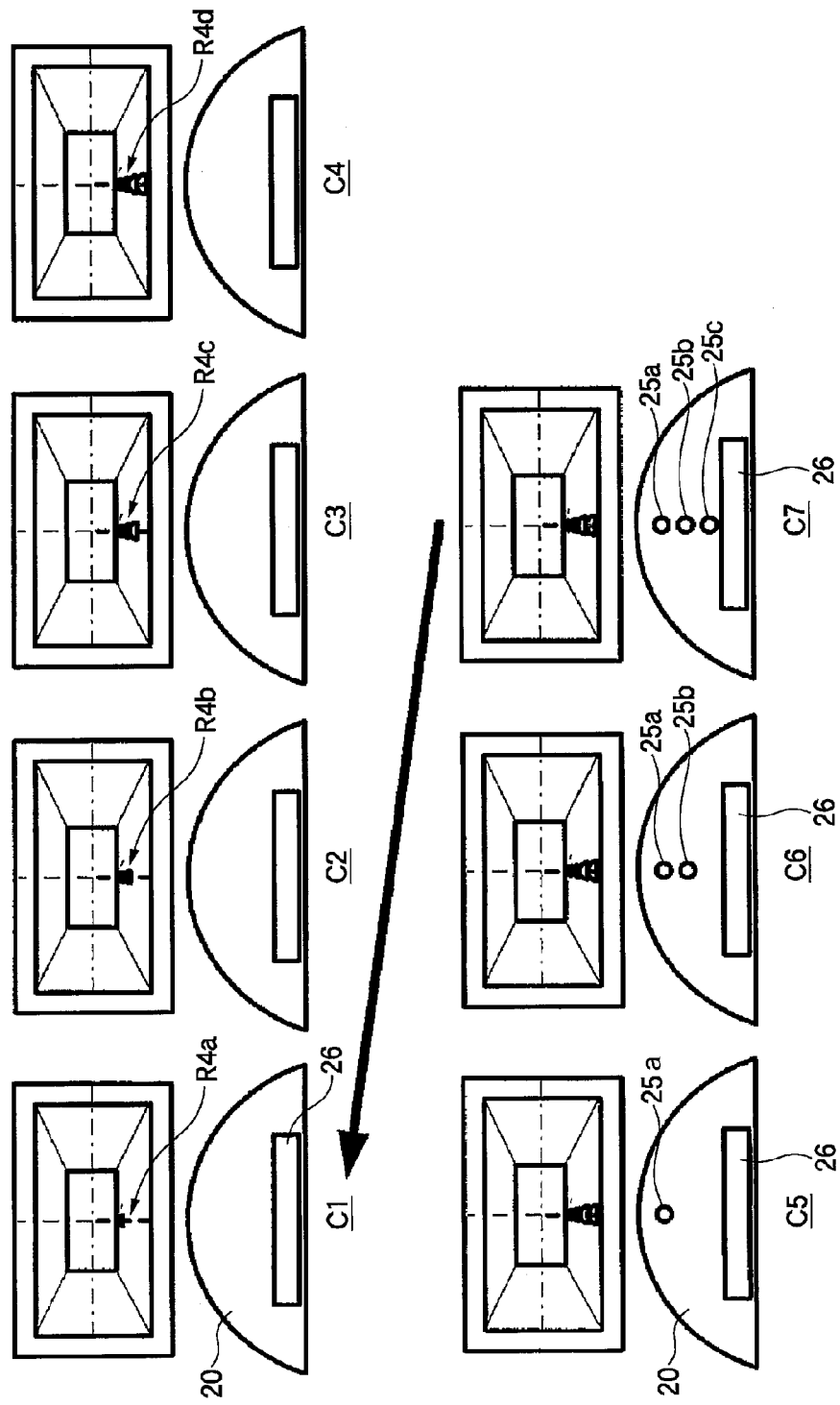
FIG. 15 is a front view showing a state transition of a guide display that is displayed at the place shown in FIG. 5.

A state transition of the guide display that is displayed at the respective places shown in FIG. 5 is shown in FIG. 15. When executing the guide display, a state C1 shown in FIG. 15 is first made and is sequentially transited to states C2, C3, C4, C5, C6, C7, C1, C2, , , , .

By the processing of step S17 of FIG. 13, the respective states C1, C2, C3, C4 of FIG. 15 are guide-displayed at the HUD device 10. Regarding the states C5, C6, C7, the guide display of the HUD device 10—side does not change. In a display R4a (virtual image) of the guide light in the state C1 shown in FIG. 15, since only one light emitting diode of the innermost included in the guide light 13 is lighted up, the corresponding state is displayed as shown. Also, in a display R4b of the guide light in the state C2, the two light emitting diodes of the inner side included in the guide light 13 are lighted up, in a display R4c of the guide light in the state C3, the three light emitting diodes of the inner side included in the guide light 13 are lighted up, and in a display R4b of the guide light in the state C4, the four light emitting diodes included in the guide light 13 are lighted up. Therefore, the corresponding states are displayed as shown. That is, the virtual image displays R4a, R4b, R4c, R4d of the guide light 13 express a situation where the light image faces from the upper to the lower, i.e., flows from the position of the display image R1 in which the warning display is displayed towards the text information display unit 26 on which the detailed information is displayed. By the moving of the light, the focus of the driver is guided to the text information display unit 26.

Subsequently, the operations of the instrument unit 20 shown in FIG. 14 are described. When the power supply of the instrument unit 20 becomes on, the instrument plate control unit 21 performs processing for the respective units in step S21. That is, the instrument plate control unit 21 initializes the internal therein and turns off all the light emitting diodes of the guide light 25. Also, the instrument plate control unit controls the speed meter driver unit 28, the tachometer driver unit 29, the water temperature gauge driver unit 30, the fuel gauge driver unit 31 and the alert display unit 32 to thus return the display contents of the respective units to the initial states.

In step S22, the instrument plate control unit 21 inputs a variety of signals from the signal input unit 22 to thus update a variety of information (vehicle speed, engine revolution, cooling water temperature, remaining amount of the fuel and the like) of the display targets to the latest information.

In step S23, the instrument plate control unit 21 transmits the latest vehicle speed information to the HUD device 10 via the communication unit 23.

In step S24, the instrument plate control unit 21 compares the latest information updated in step S22 with predetermined threshold values to thus determine whether an abnormality has occurred. When it is determined that the particular abnormality has occurred, the instrument plate control unit proceeds to step S26, and otherwise, proceeds to step S25.

In step S25, the instrument plate control unit 21 turns off all the light emitting diodes included in the guide light 25.

In step S26, the instrument plate control unit 21 notifies the HUD device 10 of the warning information indicating that the particular abnormality has occurred, via the communication unit 23.

In step S27, the instrument plate control unit 21 controls the display of the guide light 25 to thus guide the driver.

By the processing of step S27 of FIG. 14, the respective states C5, C6, C7 of FIG. 15 are guide-displayed at the HUD device 10. Regarding the states C1, C2, C3, C4, the guide light 25 of the instrument unit 20 turns off. In the state C5 shown in FIG. 15, since only the light emitting diode 25a of the most upper included in the guide light 25 is lighted up, in the state C6, the two light emitting diodes 25a, 25b of the upper included in the guide light 25 are lighted up, and in the state C7, the three light emitting diodes 25a, 25b, 25c of the upper included in the guide light 25 are lighted up.

That is, like the guide of the HUD device 10, the light emission of the light emitting diodes 25a, 25b, 25c of the guide light 25 expresses a situation where the light image faces from the upper to the lower, i.e., flows from the position of the display image R1 in which the warning display is displayed towards the text information display unit 26 on which the detailed information is displayed. Thus, by the moving of the light, the focus of the driver is guided to the text information display unit 26.

In step S28 of FIG. 14, the instrument plate control unit 21 outputs and displays the detailed information about the abnormality, which is detected in step S24, on the text information display unit 26. For example, when the temperature of the cooling water of the vehicle is abnormally increased, the detailed information "the water temperature is abnormal. Please stop the engine" may be displayed.

In step S29, the instrument plate control unit 21 executes the normal display control. That is, the instrument plate control unit outputs the variety of latest information, which is updated in step S22, to the speed meter driver unit 28, the tachometer driver unit 29, the water temperature gauge driver unit 30, the fuel gauge driver unit 31 and the alert display unit 32 to thus update the display contents of the respective instruments and the alert display unit on the instrument unit 20 to the latest states.

Meanwhile, in the above embodiment, both the display R4 of the guide light of the HUD device 10 and the display of the guide light 25 of the instrument unit 20 are used to guide the driver. However, even when any one display is used, the sufficient guide effect can be realized.

Figure 16:
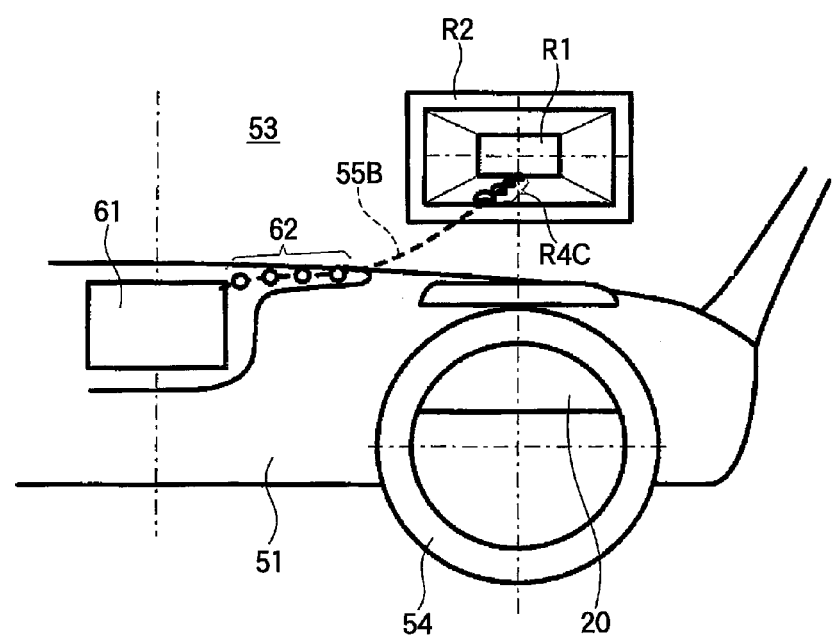
FIG. 16 is a front view showing a state where a windshield is seen from a vehicle interior of a vehicle having a HUD device of a modified embodiment mounted thereon.

Modified embodiments of the vehicular display device and the vehicular display system are described in the below. FIG. 16 shows a state where the windshield is seen from the vehicle interior of the vehicle having an HUD device of a modified embodiment mounted thereon. In the embodiment of FIG. 16, a monitor display unit 61 is arranged in the vicinity (a position closer to the left than the instrument unit 20) of the center of the instrument panel 51 of the vehicle in a vehicle width direction.

The monitor display unit 61 is a display device having a function of displaying a map for car navigation, an image that can be obtained by photographing the surrounding of the vehicle and a variety of information such as figures and texts indicating states of the respective units of the vehicle. Also, the monitor display unit 61 has a function of displaying, when the warning display '!' indicating that the particular abnormality has occurred is displayed as the display image R1 (virtual image) that is displayed by the HUD device, the detailed information relating to the corresponding abnormality, like the above illustrative embodiment.

Figure 18:
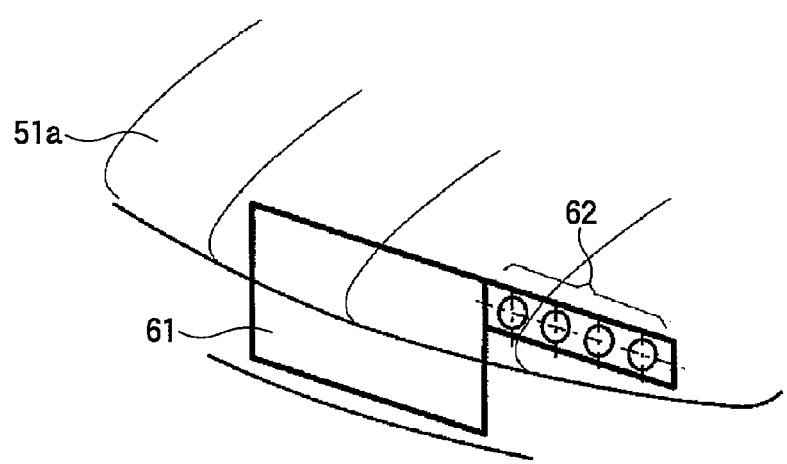
FIG. 18 is a perspective view showing an arrangement state of a monitor display unit and a guide light shown in FIG. 16.

Therefore, in the embodiment of FIG. 16, since it is necessary to guide the driver from the position of the display image R1 (virtual image) to the provision position of the monitor display unit 61, as shown with the virtual guide line 55B, a guide light 62 having an elongated shape extending rightwards from a right end portion of the monitor display unit 61 is integrally provided to the monitor display unit 61, as shown in FIG. 18. The guide light 62 has four light emitting diodes that are arranged in a line. As shown in FIG. 18, the monitor display unit 61 is arranged at the front surface of an instrument panel 51a (meter hood).

Figure 19:
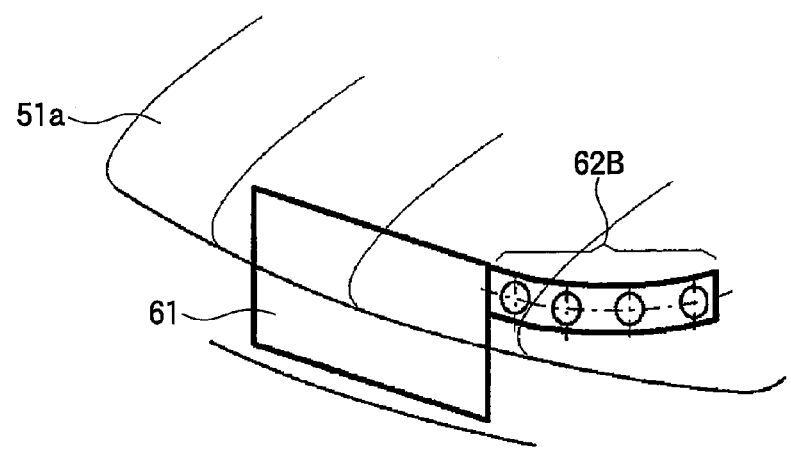
FIG. 19 is a perspective view showing a modified embodiment of FIG. 18.

Also, a guide light 62B shown in FIG. 19 may be provided instead of the guide light 62. The guide light 62B shown in FIG. 19 has the four light emitting diodes, like the guide light 62. However, the corresponding light emitting diodes are arranged along a slightly curved shape, like a virtual guide line 55B.

Although not shown, a display control unit having a display function similar to the function of the instrument plate control unit 21 shown in FIG. 1 is provided in the monitor display unit 61. The display control unit controls the display of the four light emitting diodes of the guide light 62 when it is detected that the particular abnormality has occurred, thereby guiding the driver, like the operations of the instrument plate control unit 21. Also, at the same time, the display control unit displays the detailed information about the abnormality having occurred on a screen of the monitor display unit 61.

Figure 17:
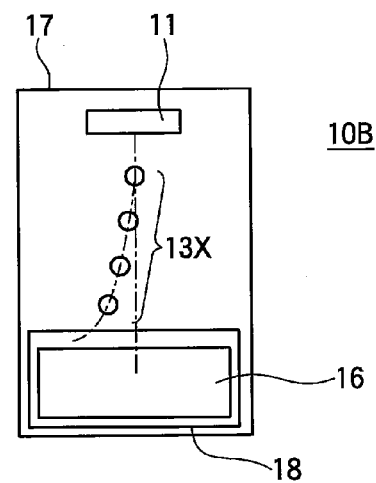
FIG. 17 is a plan view showing an internal structure of the HUD device used in the embodiment of FIG. 16, which is seen from the upper.

FIG. 17 shows an internal structure of an HUD device 10B that is used in the embodiment of FIG. 16, which is seen from the upper. The HUD device 10B of FIG. 16 has the display device 11, a guide light 13X, the enlarging mirror 16 and the transparent cover 18, like the HUD device 10. The four light emitting diodes that are included in the guide light 13X are arranged along a predetermined curve so that they coincide with the shape of the virtual guide line 55B shown in FIG. 16. Therefore, as shown in FIG. 16, a display R4C (virtual image) of the guide light guides the driver from a vicinity of a lower end of a widthwise central part of the display image R1 (virtual image) towards an obliquely downward direction along the virtual guide line 55B.

Figure 20:
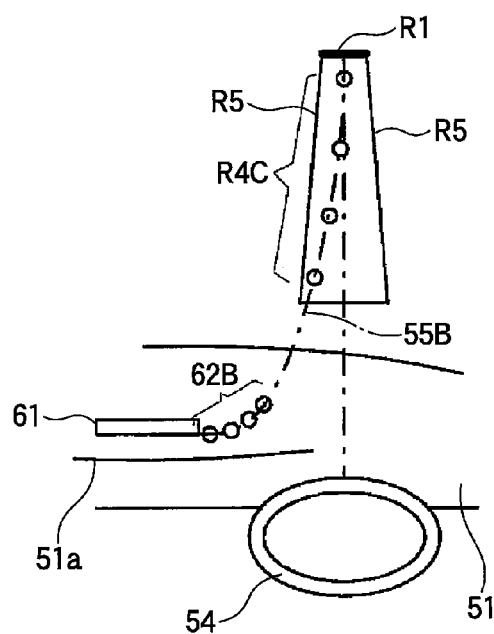
FIG. 20 is a plan view showing a positional relation of respective virtual images and a guide light that are displayed in the embodiment of FIG. 16.

FIG. 20 shows a positional relation between the respective virtual images and the guide light displayed in the embodiment of FIG. 16, which are shown from the upper. When the particular abnormality has occurred, the display R4C (virtual image) of the guide light appears in the vicinity of the display image R1 (virtual image) and the guide light 62 is displayed in the vicinity of the monitor display unit 61, as shown in FIG. 20. Therefore, just after the driver visually recognizes the warning display '!' as the content of the display image R1 (virtual image), the driver finds the detailed information that is displayed on the monitor display unit 61, under the guidance of the display R4C (virtual image) of the guide light and the display of the guide light 62 displayed in the vicinity of the warning display.

Figure 21:
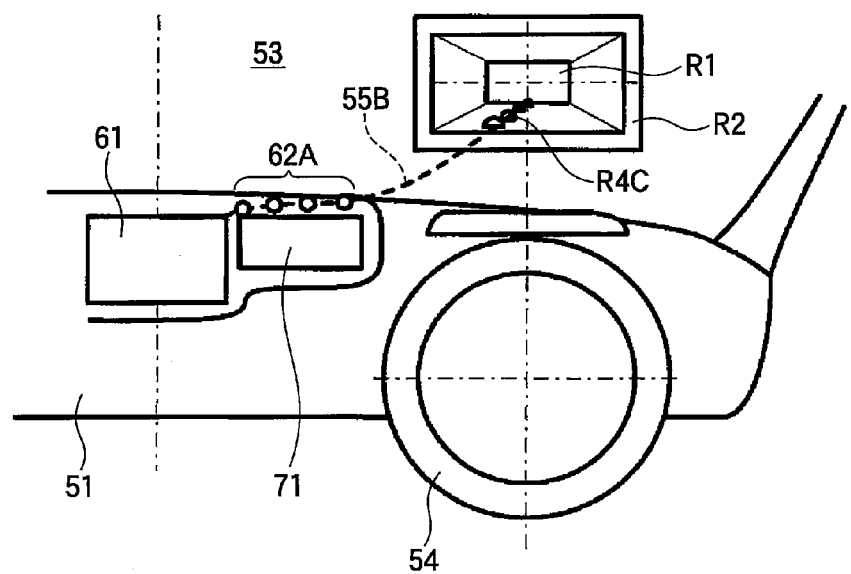
FIG. 21 is a front view showing a modified embodiment of the configuration shown in FIG. 16.
Figure 22:
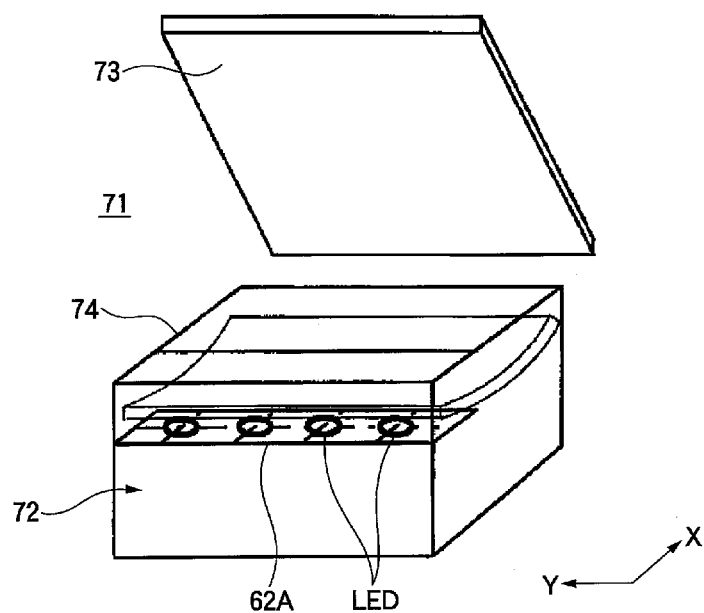
FIG. 22 is a perspective view showing a embodiment of a virtual image display device that is used in the embodiment shown in FIG. 21.
Figure 23:
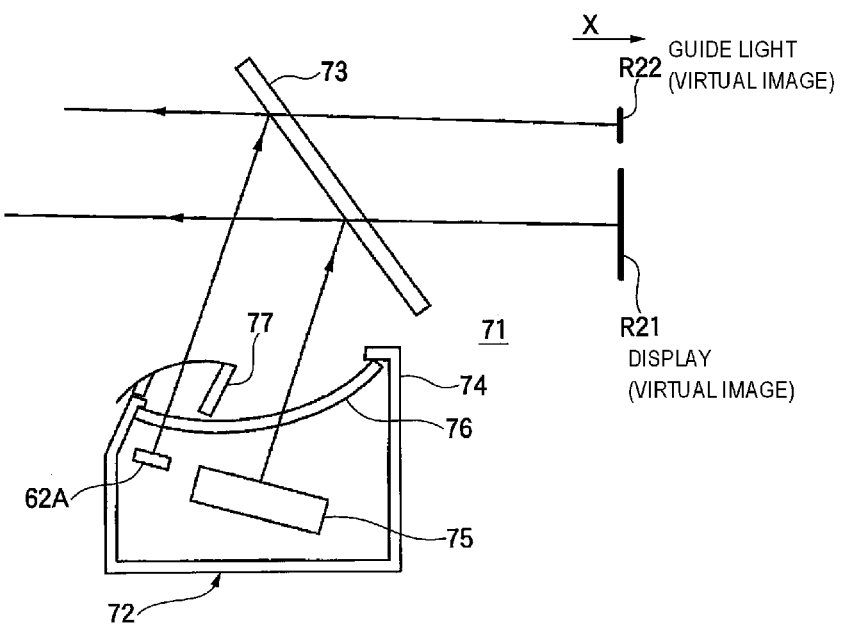
FIG. 23 is a longitudinal sectional view showing a configuration of the virtual image display device shown in FIG. 22.
Figure 24:
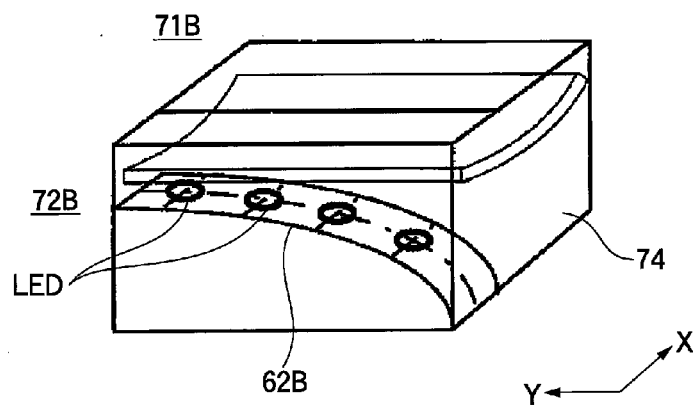
FIG. 24 is a perspective view showing a first modified embodiment of the virtual image display device shown in FIG. 22.
Figure 25:
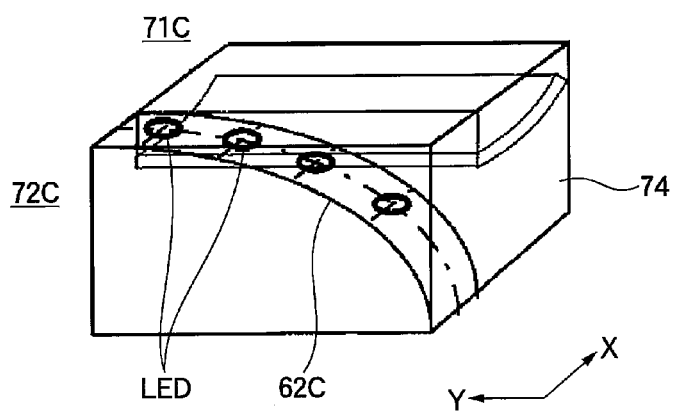
FIG. 25 is a perspective view showing a second modified embodiment of the virtual image display device shown in FIG. 22.

A modified embodiment of the configuration shown in FIG. 16 is shown in FIG. 21. A embodiment of a virtual image display device 71 that is used in the embodiment shown in FIG. 21 is shown in FIG. 22. A structure of a longitudinal sectional view seen from the virtual image display device 71 is shown in FIG. 23. Also, modified embodiments of the virtual image display device 71 of FIG. 22 are shown in FIGS. 24 and 25, respectively.

In the embodiment shown in FIG. 21, the virtual image display device 71 is further provided at the right of the monitor display unit 61. Also, a guide light 62A equivalent to the guide light 62 shown in FIG. 16 is integrally configured with the virtual image display device 71 in FIG. 21.

As shown in FIG. 22, the virtual image display device 71 has a box-shaped virtual image display device body 72 and a reflection plate (combiner) 73 that is arranged at the upper thereof. In a case 74 of the virtual image display device body 72, a display device 75 and the guide light 62A are provided, as shown in FIG. 23. An opening on an upper surface of the case 74 is covered with a transparent cover 76. As shown in FIG. 22, the guide light 62A has four light emitting diodes LED that are arranged in a line. Also, in order to separate an emitting light of the display device 75 and an emitting light of the guide light 62A, a partition wall 77 is provided above the transparent cover 76.

As shown in FIG. 23, the emitting light that is obtained by the display of the display device 75 is entered and is reflected on a surface of the reflection plate 73 and then faces the viewpoint EP of the driver. Therefore, a display R21 of a virtual image is formed at a front position (a right side in FIG. 23) of the reflection plate 73. That is, a content displayed on the display device 25 is displayed as the display R21 of the virtual image. Likewise, the light that is obtained as the respective light emitting diodes of the guide light 62A are lighted up is entered and reflected on the surface of the reflection plate 73 and then faces the viewpoint EP of the driver. Therefore, a display R22 of the guide light of a virtual image is formed at a position close to the display R21.

Although not shown, a display control unit having a display function similar to the function of the instrument plate control unit 21 shown in FIG. 1 is provided in the virtual image display device 71. The display control unit controls the display of the four light emitting diodes of the guide light 62A when it is detected that the particular abnormality has occurred, thereby guiding the driver, like the operations of the instrument plate control unit 21. Also, at the same time, the display control unit displays the detailed information about the abnormality having occurred on the screen of the display device 75.

Therefore, just after the driver visually recognizes the warning display '!' as the content of the display image R1 (virtual image) displayed at the position shown in FIG. 21, the driver finds the display content (detailed information) of the display device 75, which is displayed as the display R21 of the virtual image, under the guidance of the display R4C (virtual image) of the guide light and the display R22 of the guide light displayed in the vicinity of the warning display.

Figure 26:
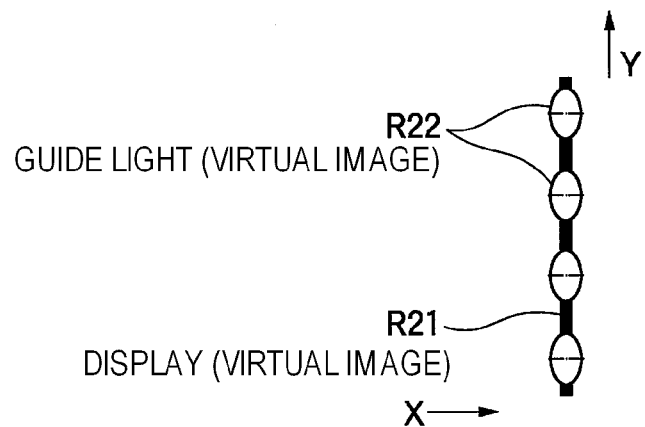
FIG. 26 is a plan view showing a positional relation between a display and a display of a guide light in the virtual image display device shown in FIG. 22.
Figure 27:
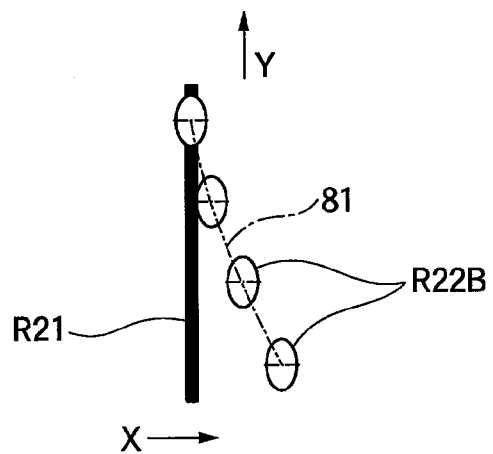
FIG. 27 is a plan view showing a positional relation between a display and a display of a guide light in the virtual image display device shown in FIG. 24.
Figure 28:
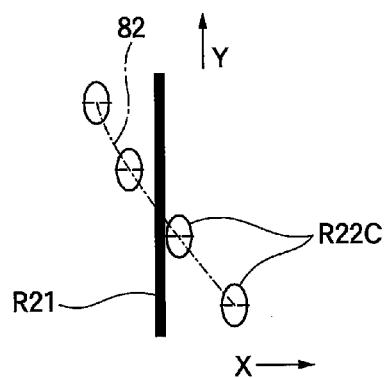
FIG. 28 is a plan view showing a positional relation between a display and a display of a guide light in the virtual image display device shown in FIG. 25.

In a modified embodiment shown in FIG. 24 and a modified embodiment shown in FIG. 25, a virtual image display device body 72B and a virtual image display device body 72C are respectively provided, and the arranging methods of the light emitting diodes of the guide lights 62B, 62C and the positions thereof in the case 74 are slightly different from those of FIGS. 22 and 23. FIGS. 26, 27 and 28 show positional relations between the display R21 and the display R22 of the guide light, which are formed when the virtual image display device 71 shown in FIGS. 22, 24 and 25 are used, which are shown from the upper.

In the virtual image display device 71 of FIG. 22, the four light emitting diodes LED of the guide light 62A are linearly arranged in an arrow Y direction. Therefore, as shown in FIG. 26, the display R21 and the display R22 of the guide light are linearly formed on the substantially same axis. In the meantime, in a virtual image display device 71B of FIG. 24, the four light emitting diodes LED of the guide light 62B are arranged in a line so that they are curved relative to the arrow Y direction. Therefore, as shown in FIG. 27, a display R22B of the guide light is formed along a virtual guide line 81 having a direction different from the axis of the display R21. Likewise, in a virtual image display device 71C of FIG. 25, the four light emitting diodes LED of the guide light 62C are arranged in a line so that they are curved relative to the arrow Y direction. Therefore, as shown in FIG. 28, a display R22C of the guide light is formed along a virtual guide line 82 having a direction different from the axis of the display R21.

Figure 29:
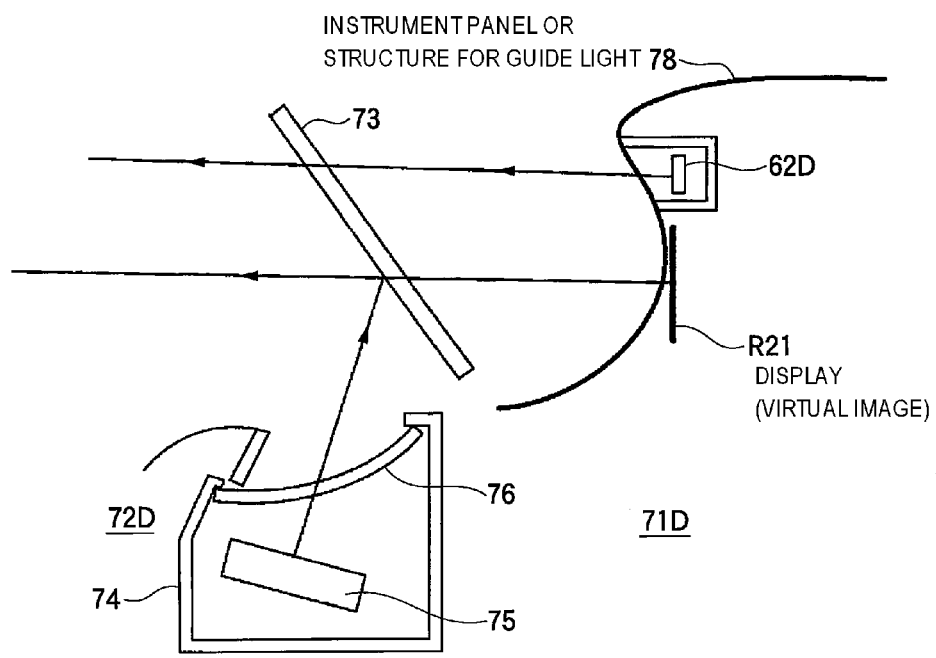
FIG. 29 is a longitudinal sectional view showing a modified embodiment of the configuration shown in FIG. 23.

A modified embodiment of the configuration of the virtual image display device 71 shown in FIG. 23 is shown in FIG. 29. In a virtual image display device 71D shown in FIG. 29, a guide light 62D is arranged outside a virtual image display device body 72D. That is, the guide light 62D is embedded in the vicinity of the surface of the instrument panel or a structure for a special guide light at the front of the reflection plate (combiner) 73. The display of the guide light 62D transmits the reflection plate (combiner) 73 and is visually recognized by the driver, as a substance not a virtual image. The guide light 62D is arranged in the vicinity of the position at which the display R21 of the virtual image is formed, as shown in FIG. 29.

In the above illustrative embodiments, the guidance is made from the display position of the HUD device 10 towards the text information display unit 26 or monitor display unit 61 on which the detailed information is displayed. However, the guidance may be made in a reverse direction. For example, when any information is displayed on the text information display unit 26, the guidance may be made in a reverse direction in displaying the relating information with the HUD device 10.

Also, in the above illustrative embodiments, when carrying out the guidance by using the display of the guide light 13 or guide light 25, the number of the light emitting elements to be lighted up is controlled so that it increases in order of one, two and three. However, the other display control may be made. For example, only one light emitting element may be lighted all the time and the position of the light emitting element to be lighted may be sequentially switched from the upper towards the lower.

Also, in the above illustrative embodiments, the display position of the detailed information is concentrated on one place. However, there is a possibility that all of the text information display unit 26 shown in FIG. 4 and the monitor display unit 61 and virtual image display device 71 shown in FIG. 21 will be mounted on the same vehicle. The detailed information may be selectively displayed on any one of the text information display unit 26, the monitor display unit 61 and the virtual image display device 71, in correspondence to a type of an abnormality having occurred. In this situation, a first guide light for guiding the driver from the position of the display image R1 (virtual image) to the text information display unit 26, a second guide light for guiding the driver to the monitor display unit 61 and a third guide light for guiding the driver to the virtual image display device 71 may be respectively provided and the plurality of guide lights may be selectively displayed to carry out the guidance, in correspondence to a type of an abnormality having occurred. Also, in this case, the plurality of guide lights may be displayed with different colors.

As described above, it is assumed that the vehicular display device and the vehicular display system of the invention are mounted and used on a vehicle having a head-up display device. By mounting the vehicular display device and the vehicular display system of the invention, when the warning display such as '!' appears in the display of the head-up display, even a driver such as a beginner driver who does not understand the operations of the system can be automatically guided to the part at which the detailed information is displayed. Thereby, it is possible to prevent a situation where the driver ignores the warning display and continues to drive the vehicle, thereby previously preventing the serious vehicle malfunction from occurring.

According to the vehicular display device, when the particular information is displayed on the display unit, the guide display unit turns to a display state. Therefore, a driver can visually recognize a display of the guide display unit when the particular information displayed as a virtual image is displayed. Also, since the guide display unit is arranged between the first display region and the second display region, the driver also notices the second display region that is in the vicinity of the guide display unit. That is, it is possible to guide a driver's notice to the second display region in which the detailed information is displayed.

Also, according to the vehicular display device, since the guidance is carried out by the display of the lighting up or turning off of the light emitting element, the guide display unit can be easily recognized by the driver. Therefore, it is possible to guide the driver to the second display region more efficiently.

Also, according to the vehicular display device, it is possible to express the guide display as a flowing of the light in a direction from the first display region towards the second display region. Therefore, a general driver intuitively understands that it is sufficient to see the second display region. Thus, it is possible to carry out the efficient guidance.

According to the vehicular display system, when the particular information is displayed on the first vehicular display unit, it is possible to control the guide display unit to a display state. Since the guide display unit is arranged between the first display region and the second display region, it is possible to guide the driver so that the driver can know that the display of the first display region and the display of the second display region are associated with each other.

Also, according to the vehicular display system, it is possible to express the guide display as a flowing of the light in a direction from the first display region towards the second display region. Therefore, a general driver understands that it is sufficient to see the second display region so as to comprehend a current situation. Thus, it is possible to carry out the efficient guidance.

According to the vehicular display device, when the predetermined particular information is displayed in the second display region, it is possible to control the guide display unit to a display state. That is, when the restricted information such as warning is displayed in the second display region by a display function of a predetermined head-up display and the like, the guide display unit is displayed, so that it is possible to guide the driver to the first display region in which the detailed information is displayed.

Also, according to the vehicular display device, it is possible to express the guide display as a flowing of the light in a direction from the first display region towards the second display region. Therefore, a general driver intuitively understands that it is sufficient to see the first display region so as to comprehend a current situation. Thus, it is possible to carry out the efficient guidance.

Also, according to the vehicular display device, it is possible to display the detailed information and the guide display, as virtual images, at positions sufficiently distant from a viewpoint position of the driver. Therefore, a position at which a display content of the first display region is displayed and a position at which a display content of the second display region is displayed become close to each other, so that the visibility is improved.

According to the vehicular display device and the vehicular display system of the invention, it is possible to carry out the guidance, in the vehicle having the head-up display mounted thereon, which aids the driver who does not understand how the display system operates to comprehend a situation when the special display such as vehicular warning appears. That is, by the display of the guide display unit, it is possible to guide the driver from the display position such as warning to the display position of the detailed information.

Although the invention has been specifically described with reference to the specific illustrative embodiments, it is apparent to one skilled in the art that a variety of changes and modifications can be made without departing from the spirit and scope of the invention.

According to the vehicular display device and the vehicular display system of the invention, it is possible to carry out the guidance, in the vehicle having the head-up display mounted thereon, which aids the driver who does not understand how the display system operates to comprehend a situation when a special display such as vehicular warning appears. That is, by the display of the guide display unit, it is possible to carry out the guidance so that the driver is guided from the display position of the warning light to the display position of the detailed information.

What is claimed is:

1. A vehicular display device, including a display unit that displays visible information and a light projection unit that guides light including the visible information displayed on the display unit to a predetermined projection surface, and displaying the visible information as a virtual image, the vehicular display device comprising:
   a guide display unit that indicates a relationship between at least positions of a first display region in which the virtual image is displayed by projection of the light projection unit and a second display region in which detailed information is displayed, the detailed information having an association with a content of particular information that is displayed on the display unit under a predetermined condition; and
   a guide display control unit that controls the guide display unit into a display state when the particular information is displayed on the display unit,
   wherein the guide display unit comprises a first guide display unit including a first guide light comprising at least one light emitting element that is arranged on the vehicular display device and configured to display as a second virtual image adjacent to the virtual image of the visible information on the predetermined projection surface while the first visible information is displayed and a second guide display unit including a second guide light comprising at least one light emitting element that is arranged on the second display region, and
   wherein the predetermined projection surface does not include the second display region.

2. The vehicular display device according to claim 1, wherein the guide display unit comprises at least one light emitting element that can be lighted up and turned off by the guide display control unit.

3. The vehicular display device according to claim 2, wherein the guide display unit comprises a plurality of light emitting elements that can be lighted up and turned off by the guide display control unit, and
   wherein the guide display control unit individually lights up and turns off the plurality of light emitting elements and displays a flowing state of a direction from the first display region towards the second display region.

4. A vehicular display system comprising:
   a first vehicular display device, including a display unit that displays first visible information and a light projection unit that guides light including the first visible information displayed on the display unit to a predetermined projection surface, and displaying the first visible information as a virtual image;
   a second vehicular display device displaying more information than the first vehicular display device, as second visible information;
   a guide display unit, provided to at least one of a place on the first vehicular display device, a place on the second vehicular display device and a space between the places, and indicating a relationship between at least positions of a first display region in which the virtual image is displayed by projection of the light projection unit of the first vehicular display device and a second display region on the second vehicular display device in which detailed information is displayed, the detailed information having an association with a content of particular information that is displayed in the first display region under a predetermined condition; and
   a guide display control unit that controls the guide display unit to a display state when the particular information is displayed on the display unit of the first vehicular display device,
   wherein light emitting elements contained in the guide display unit are configured to be positioned at a position different from the first visible information in a front-rear direction of a vehicle so that the light emitting elements contained in the guide display unit are displayed with a visible depth difference compared to the first visible information from a viewpoint of a driver along a virtual guide line connecting the virtual image and second vehicular display device,
   wherein the guide display unit comprises a first guide display unit including a first guide light comprising at least one light emitting element that is arranged on the first vehicular display device and configured to display as a second virtual image adjacent to the virtual image of the first visible information while the first visible information is displayed and a second guide display unit including a second guide light comprising at least one light emitting element that is arranged on the second vehicular display device, and
   wherein the predetermined projection surface does not include the second vehicular display device.

5. The vehicular display system according to claim 4, wherein the guide display control unit, individually lights up and turns off the light emitting element for guidance of the first guide display unit and the light emitting element of the second guide display unit, and displays a flowing state of a direction from the first display region towards the second display region.

6. A vehicular display device displaying detailed information on a vehicle as first visible information, the vehicular display device comprising:
   a guide display unit that is arranged between a first display region in which the first visible information is displayed as a virtual image and a second display region in which information is displayed as second visible information, and that indicates a relationship between at least positions of the first display region and the second display region, the information displayed in the second display region having an association with the detailed information and more restricted than the detailed information; and
   a guide display control unit that controls the guide display unit into a display state when predetermined particular information is displayed in the second display region
   wherein light emitting elements contained in the guide display unit are configured to be positioned at a position different from the first visible information in a front-rear direction of a vehicle so that the light emitting elements contained in the guide display unit are displayed with a visible depth difference compared to the first visible information from a viewpoint of a driver along a virtual guide line connecting the virtual image and second display region, wherein the guide display unit comprises a first guide display unit including a first guide light comprising at least one light emitting element that is arranged on the vehicular display device and configured to display as a second virtual image displaced from the virtual image of the first visible information while the first visible information is displayed and a second guide display unit including a second guide light comprising at least one light emitting element that is arranged on the second display region, and wherein the predetermined projection surface does not include the second display region.

7. The vehicular display device according to claim 6, wherein the guide display unit includes a plurality of light emitting elements that can be lighted up and turned off by the guide display control unit, and wherein the guide display control unit, individually lights up and turns off the plurality of light emitting elements, and displays a flowing state of a direction from the first display region towards the second display region.

8. The vehicular display device according to claim 6, further comprising a light reflection plate that is arranged at a position displaced from a windshield of the vehicle towards a vehicle interior, wherein the detailed information is projected onto the light reflection plate.

\* \* \* \* \*